USO12135785B2

United States Patent
Galhardo Moia et al.

(10) Patent No.: US 12,135,785 B2
(45) Date of Patent: Nov. 5, 2024

(54) NON-INVASIVE COMPUTER IMPLEMENTED METHOD FOR MALWARE DETECTION, A NON-TRANSITORY COMPUTER-READABLE MEDIUM, AND, A SYSTEM FOR DETECTING MALWARE IN AN APPLICATION

(71) Applicant: SAMSUNG ELETRÔNICA DA AMAZÔNIA LTDA., São Paulo (BR)

(72) Inventors: Vitor Hugo Galhardo Moia, Campinas (BR); Leonardo Barbosa Da Costa, Campinas (BR)

(73) Assignee: SAMSUNG ELETRÔNICA DA AMAZÔNIA LTDA., São Paulo (BR)

( * ) Notice: Subject to any disclaimer, the term of this patent is extended or adjusted under 35 U.S.C. 154(b) by 278 days.

(21) Appl. No.: 17/689,365

(22) Filed: Mar. 8, 2022

(65) Prior Publication Data

US 2023/0214487 A1    Jul. 6, 2023

(30) Foreign Application Priority Data

Jan. 4, 2022   (BR) ..................... 10 2022 000128-6

(51) Int. Cl.
*G06F 21/00*    (2013.01)
*G06F 21/56*    (2013.01)
*G06N 20/20*    (2019.01)

(52) U.S. Cl.
CPC .......... *G06F 21/562* (2013.01); *G06F 21/566* (2013.01); *G06N 20/20* (2019.01); *G06F 2221/033* (2013.01)

(58) Field of Classification Search
CPC ..... G06F 21/568; G06F 16/955; G06F 21/566
See application file for complete search history.

(56) References Cited

U.S. PATENT DOCUMENTS 9,064,115 B2    6/2015   Tuvell et al.
9,479,357 B1    10/2016  Fu et al.
(Continued)

FOREIGN PATENT DOCUMENTS

CN        107392025 B       6/2020
WO    WO-2015066509 A1 *    5/2015   ............. G06F 21/56

OTHER PUBLICATIONS

Ahmad Salah et al., "A Lightweight Android Malware Classifier Using Novel Feature Selection Methods", MDPI Symmetry, vol. 12, No. 858, 2020.

(Continued)

*Primary Examiner* — Tri M Tran
(74) *Attorney, Agent, or Firm* — STAAS & HALSEY LLP (57) ABSTRACT

Android has been a constant target of cybercriminals that try to attack one of the most used operating systems, commonly using malicious applications (denominated malwares). The present invention uses a lightweight and non-invasive approach to detect malware in the Android system. The method employs a set of specific-type detectors in which each one performs a multi-stage analysis, based on rules and machine learning techniques, in different phases of the application cycle. The invention includes a process to obtain application's characteristics that does not infringe licenses and terms of use of applications; a more efficient process to classify applications on Android devices that requires less processing power; and, finally, by using different detection phases that employ distinct sets of characteristics obtained from the application, the present invention can outperform the detection performance of techniques of the prior-art and reduce the number of misclassified samples.

24 Claims, 2 Drawing Sheets

(56) References Cited

U.S. PATENT DOCUMENTS

| | | | |
|---|---|---|---|
| 9,721,212 B2* | 8/2017 | Gupta | G06F 21/552 |
| 10,320,835 B1 | 6/2019 | Book et al. | |
| 10,929,532 B1 | 2/2021 | Margaritelli | |
| 2019/0007433 A1* | 1/2019 | McLane | H04L 9/0643 |

OTHER PUBLICATIONS

Fabio Pierazzi et al., "A Data-driven Characterization of Modern Android Spyware", ACM Transactions on Management Information Systems, vol. 11, No. 1, Article 4, Apr. 2020.
Hossein Feredooni et al., "Efficient Classification of Android Malware in the wild using Robust Static Features", Protecting Mobile Networks and Devices, pp. 195-222, 2016.
Amirhossein Gharib, "DNA-Droid: A Real-time Android Ransomware Detection Framework", The University of New Brunswick, Nov. 2017.

* cited by examiner

NON-INVASIVE COMPUTER IMPLEMENTED METHOD FOR MALWARE DETECTION, A NON-TRANSITORY COMPUTER-READABLE MEDIUM, AND, A SYSTEM FOR DETECTING MALWARE IN AN APPLICATION

CROSS-REFERENCE TO RELATED APPLICATION(S)

This application is based on and claims priority under 35 U.S.C. § 119 to Brazilian Patent Application No. BR 10 2022 000128-6, filed on Jan. 4, 2022, in the Brazilian Intellectual Property Office, the disclosure of which is incorporated by reference herein in its entirety.

FIELD OF THE DISCLOSURE

The present invention relates to a method and a system for detecting malware applications on Android devices. More specifically, the present invention relates to a non-invasive method for detecting malware software and/or applications on Android devices.

DESCRIPTION OF RELATED ART

Android is one of the most used operating systems and, as such, has been a constant target of attacks from cybercriminals. Most often, these attacks make use of malicious applications/programs (generally referred to as "malware") that, once installed on an Android device, can harm users by, for instance, leaking sensitive data (e.g., bank account details, passwords, credit card data, etc.), blocking access to the device's data and demanding monetary compensation for the ransom, or even leveraging social engineering scams. A large number of malicious applications are distributed on a daily basis through different distribution vectors, such as application repositories, including official and third-party stores, or untrusted sources like Web repositories. The huge number of existing Android malware applications and the high speed in which new malware applications are created have motivated the security community to design (and continuously improve) solutions to automatically detect malware.

In general, in order to analyze an Android application, many detection solutions make use of information about the application's Android Package (APK) file, a file which contains all the necessary data to install the application on an Android device, including but not limited to the following components:

Manifest file: contains metadata related to the application, such as the Android permissions and intents. Permissions are elements of the Android framework that allow users to control which applications can have access to certain device resources. For example, the CALL_PHONE permission allows an application to place phone calls. All permissions that the application will request for the user at some point must be declared in the Manifest file. In turn, an intent is a messaging object that can be used to request an action from another application component. For instance, the DIAL intent can be employed by an application to dial a phone number in the phone call application and show it to the user.

DEX files: those are files in the Dalvik Executable format related to the application source code, which contain Dalvik bytecodes, understandable by the Android operating system. Android applications are generally written in the Java or Kotlin programming languages, compiled to bytecodes understandable by the virtual machines corresponding to these languages, and then translated to Dalvik bytecodes stored in DEX files. These files are used to execute the application on Android devices.

Assets folder: directory containing files of different formats (e.g., audio, image) used by the application to perform its operations.

As mentioned previously, due to the high popularity of the Android operating system, cybercriminals have been targeting this platform by releasing huge amounts of Android malware applications on a daily basis. To deal with these threats, several automatic Android malware detection mechanisms based on machine learning (ML) have been proposed. In general, the ML models proposed in the state of the art combine different types of features to evaluate whether an analyzed application is malware or benign. These features are generally based on contents of the application's APK file (static features), which provides all the necessary data to install the application on an Android device. While some solutions do not state how to obtain such features from applications, several others propose obtaining the features directly from the APK file. Nevertheless, obtaining the features in such a way requires the reverse-engineering, decompilation, or disassembly of the APK, equivalent to gaining knowledge about the application's operations by decoding and analyzing its files, which most often infringes the "Licenses and Terms of use" of many applications.

In that sense, there exist documents in the prior-art that propose different methods and tools for malware detection.

Patent document U.S. Ser. No. 10/929,532B1 ("Detecting malware in mobile applications via static analysis") presents a technique based on static analysis to detect malware on mobile devices using ML. The method performs on-device detection, i.e., without the help of an external service, and allows the use of a variety of ML algorithms, using three types of features: number of times the application calls a function, permissions used by the application, and strings of interest found in the application's code.

Patent document U.S. Ser. No. 10/320,835B1 ("Detecting malware on mobile devices") describes a permission-based (run on-device) malware detector for mobile devices. The system uses rules to evaluate if a given application of a certain type (e.g., games, entertainment, news, etc.) has any suspicious permissions and, therefore, should be considered malware. According to the authors of patent U.S. Ser. No. 10/320,835B1, the type of application may indicate whether certain permissions are considered normal or not, and the permissions that cause one type of application to be classified as concerning do not necessarily cause another type of application to have the same classification. The method described in U.S. Ser. No. 10/320,835B1 requires internet connection to communicate with a threat analysis center to obtain a list of permissions for each application type.

Patent document U.S. Pat. No. 9,064,115B2 ("Malware detection system and method for limited access mobile platforms") proposes a static analysis-based system to detect mobile malware (on-device approach) using rules. The system described in U.S. Pat. No. 9,064,115B2 uses a set of rules created to describe specific malware families involving features such as application name, size, vendor, version, description, URL, hash, CRC, DLL imports, and Opcodes. However, some of these features require reverse-engineering, decompilation or disassembly of the application, which is often prohibited by licenses and terms of use adopted by many applications.

Patent document U.S. Pat. No. 9,721,212B2 ("Efficient on-device binary analysis for auto-generated behavioral models") presents a method to detect activities that result in performance degradation on mobile devices, which includes malware applications. First, the system described in U.S. Pat. No. 9,721,212B2 determines the application category (e.g., games, entertainment, news, etc.) based on application-specific features. Then, based on the application's category, a specific classifier is used to detect non-benign behaviors. The features used for the classification can be obtained from a static analysis of the binary file, before the application is installed, to identify various characteristics used in the binary file (e.g., APIs, methods, function calls, etc.), as well as the hardware and/or other components of the mobile device likely to interact with the application during runtime.

Patent document U.S. Pat. No. 9,479,357B1 ("Detecting malware on mobile devices based on mobile behavior analysis") explores dynamic analysis and a detection approach, carried out off-device, to identify malicious software. A monitor system analyzes the application during runtime, collecting suspicious actions performed by it, such as sending an SMS message, initiating a phone call, accessing the contact list and an on-device camera, etc. All this information is transmitted to a remote system which will analyze these actions.

Patent document CN107392025B ("Malicious android application program detection method based on deep learning") discloses a method to detect Android malicious software using deep learning and both static and dynamic analysis. A set of 41 static features are obtained from the manifest file of an APK file, while other 85 features, comprising 13 API and 72 system calls, are obtained during application execution. The problem regarding patent CN107392025B, which is solved by the present invention, is that the static features are all obtained from the manifest file, requiring the disassembly of the APK, which is not usually allowed by licenses and terms of use of many applications. Furthermore, monitoring the application to obtain the list of API and system calls is not an efficient process.

The paper "*A Lightweight Android Malware Classifier Using Novel Feature Selection Methods*" (by Salah, A., Shalabi, E. and Khedr, W. Symmetry, 12(5), p. 858, 2020) presents an approach based on static analysis to detect Android malware, using ML and a proposed technique to reduce the number of features used by the ML model. Initially, the approach described in the paper obtains features from the manifest file and from the decoded DEX code of Android applications, including features related to permissions, application components, intent filters, API calls, and URL strings. The problem concerning the approach used in this paper relates to the invasive feature for obtaining features, which requires disassembling the application to extract the features, violating the licenses and terms of use employed by many applications.

The paper "*A Data-driven Characterization of Modern Android Spyware*" (by Pierazzi, F., Mezzour, G., Han, Q., Colajanni, M. and Subrahmanian, V. S. ACM Transactions on Management Information Systems (TMIS), 11(1), pp. 1-38, 2020) proposes an off-device detection approach based on static and dynamic features obtained by running Android applications on Koodous platform. Multiple classifiers are used to label a given application, and the results are combined by an Ensemble Late Fusion algorithm. The static features used for the classification are the hash of the certificate used to sign the application, the set of used permissions, and the number of some application components, such as activities, intents, services, providers, and receivers. The dynamic features correspond to read and write operations, started background processes, load of DEX files, cryptographic operations, outgoing and incoming network activity, and SMS messages sent.

The paper "*Efficient Classification of Android Malware in the wild using Robust Static Features*" (by Fereidooni, H., Moonsamy, V., Conti, M. and Batina, L. Protecting Mobile Networks and Devices, pp. 195-222, 2016) uses a ML-based approach to detect and classify Android malicious software according to their families. Static features are obtained from the application, such as intents, permissions, system commands, suspicious API calls, and other features related to malicious activities through a Dalvik bytecode analysis (e.g., reading IMEI, loading native, dynamic, and reflection code, reading location information through GPS/Wi-Fi, etc.). These features are given as input to a feature selection technique (the authors suggest using the technique SelectFromModel) to remove the features that do not contribute to the classification process. Next, the selected features feed a single ML classifier to obtain the classification results. The problem with this approach is that it uses an invasive feature obtaining process, infringing licenses and terms of use of many applications by decompiling or disassembling APK files to obtain the necessary features for the classification.

The paper "*DNA-Droid: A Real-Time Android Ransomware Detection Framework*" (by Gharib, A. and Ghorbani, A., 2017, August. International Conference on Network and System Security, pp. 184-198, 2017) focus on the detection of malicious software of the type ransomware using ML techniques and combining static and dynamic analysis in mobile devices. An application is first analyzed by the static analysis module that extracts features from the APK file related to strings (having content related to encryption, locking, threating, pornography, or money), images (logos), API calls, and permissions. It classifies an application as benign, suspicious, or malware. In case the application is marked as benign or malware, the analysis is finished. For suspicious applications, the method described in the paper uses the dynamic analysis module, considering API call sequences to detect malicious behavior.

Despite the above solutions and proposed methods/tools, there are still issues with current state-of-the-art approaches to malware detection. Most state-of-the-art solutions using ML (e.g., U.S. Ser. No. 10/929,532B1, U.S. Pat. No. 9,064,115B2, U.S. Pat. No. 9,721,212B2, CN107392025B, "A Lightweight Android Malware Classifier Using Novel Feature Selection Methods", "Efficient Classification of Android Malware in the wild using Robust Static Features", and "DNA-Droid: A Real-Time Android Ransomware Detection Framework") require performing reverse-engineering, decompilation, or disassembly of an application to obtain the feature(s) to be analyzed. Some proposals, for instance, employ features related to API calls (classes or methods used in the source code) that in order to be obtained require disassembling the APK file and disassembling its DEX files. As previously mentioned, this violates many applications' "Licenses and Terms of use" that developers and companies use to protect their intellectual property. Furthermore, the processes employed by previous solutions to obtain features and the large number of features needed to perform classification can be inefficient and consume a considerable amount of the device's energy.

Android permissions used by applications are another type of elements that ML-based malware detectors of the art often consider as features. As mentioned before, permissions that the application will request for the user are declared in the Manifest file, which is encoded when the application's APK file is finally created by the developer. Due to this, obtaining permission features directly from the APK file requires decoding the Manifest file, another operation not allowed according to many licenses and terms of use available in applications commonly found in the Android application market.

In addition, previous solutions propose employing all the obtained features every time an application is to be analyzed by the ML-based malware detector. Using different types of features demands performing different processing steps in the Android device to obtain said features. The larger the obtained feature vector is, the more processing power is required and more energy is consumed. Moreover, obtaining the features directly from the APK file can also consume considerable amounts of processing and energy. Since these two elements are usually limited on mobile devices, the tasks related to the analysis of applications should be designed to be as lightweight as possible, using the minimum number of features required to achieve good detection performance.

Another problem related to ML solutions is that, although they allow the identification of threats never seen before by the detector, they misclassify many applications (i.e., benign applications are classified as malware—false positive case—or malware applications are classified as benign—false negative case), causing a negative impact on the experience of users that may eventually lose their trust on the system.

Malware detection solutions of the prior-art usually use a single ML model to detect several malware types, which can produce many false alarms. Some solutions employ an ensemble of different types of classifiers (several ML models performing the classification and then combining the results to obtain a final one) to perform classification and avoid false alarms. However, this alternative may consume too many resources during every classification performed and may also require a large set of features to feed different models. Having many false alarms creates a negative impact on users that eventually may lose their trust on the system. For this reason, finding an efficient way of dealing with false positives is required for an Android malware detector to be attractive and widely adopted.

As such, the prior-art lacks a non-invasive malware detection solution that does not require reverse-engineering, decompilation or disassembly of an application being analyzed. Furthermore, considering the mobile element of the devices that run the Android system, the prior-art also lacks a solution that is less energy consuming, while being more robust and accurate.

In addition, the prior-art lacks an on-device solution that can detect different types of malware applications and be easily scaled without considerably increasing processing time and the necessary processing capacity.

SUMMARY OF THE INVENTION

In order to overcome the problems and limitations of the prior-art as detailed above, the present invention discloses a method to analyze applications on Android devices without infringing their licenses and terms of use. Since many applications installed by users on their devices can have licenses and similar documents/contracts that forbid decompiling or disassembling the applications, it is imperative that a detection solution comply with such restrictions.

Thus, the present invention employs a non-invasive process when extracting the necessary characteristics of applications to be installed. The invention adopts Android native API functions to obtain all necessary information it requires to perform the classification task.

Therefore, the present invention relates to a non-invasive computer implemented method for malware detection in an application to be installed on a device, the method comprising:
  obtaining, by means of a first lightweight analysis submodule and before the application is installed, a first set of features of the application by employing system native functions of the device;
  performing one or more lightweight analyses on the first set of features, wherein each lightweight analyses comprises a set of rules configured to identify a single type of malware; checking whether the first set of features matches the set of rules of at least one of the one or more lightweight analyses;
  if the first set of features matches none of the sets of rules of the one or more lightweight analyses, then a negative classification label is outputted;
  if the first set of features matches at least one of the set of rules of the one or more lightweight analyses, performing a deep analysis for the type of malware of each of the at least one matched set of rules;
  wherein the deep analysis comprises:
  obtaining, by means of a deep analysis submodule, a second set of features of the application by employing system native functions of the device;
  running a first machine learning, ML, model, wherein the first ML model outputs a classification label for the analyzed application.

The present invention also relates to a non-transitory computer-readable medium which comprises computer-readable instructions that, when executed by one or more processors, cause the one or more processors to perform the method as defined in the present invention.

Furthermore, the present invention relates to a system for detecting malware in an application to be installed on a device using the method in accordance with the present invention, wherein the system comprises:
  a feature obtainment module comprising a first lightweight analysis submodule configured to obtain, before the application is installed, a first set of features of the application by employing system native functions of the device;
  a classification module comprising a second lightweight analysis submodule configured to:
    perform one or more lightweight analyses on the first set of features, wherein each lightweight analysis comprises a set of rules configured to identify a single type of malware;
    check whether the first set of features matches the set of rules of at least one of the one or more lightweight analyses;
    if the first set of features matches none of the sets of rules of the one or more lightweight analyses, then a negative classification label is outputted;
    if the first set of features matches at least one of the set of rules of the one or more lightweight analyses, the system performs a deep analysis for the type of malware of each of the at least one matched set of rules;

wherein the deep analysis is performed by means of:
a first deep analysis submodule configured to obtain a second set of features of the application by employing system native functions of the device;
a second deep analysis submodule configured to run a first machine learning, ML, model, wherein the first ML model outputs a classification label for the analyzed application.

BRIEF DESCRIPTION OF THE DRAWINGS

The invention is explained in greater detail below and makes references to the Figures when necessary. Attached herewith are.

DETAILED DESCRIPTION OF THE INVENTION

It is important to highlight that the following examples and descriptions of the preferred embodiments of the invention should in no way be interpreted as limiting of the scope of the present invention. In fact, the skilled person will be perfectly capable of appreciating that the present invention may be easily modified and scaled to accommodate characteristics of different scenarios. The following descriptions and examples merely serve to illustrate one or more of the many possible embodiments of the invention.

The present invention relates to a non-invasive computer implemented method for malware detection comprising, when a user triggers an installation event of an application on a device:
obtaining, by means of a first lightweight analysis submodule and before the application is installed, a first set of features of the application by employing system native functions of the device;
performing one or more lightweight analyses on the first set of features, wherein each lightweight analyses comprises a set of rules configured to identify a single type of malware;
checking whether the first set of features matches the set of rules of at least one of the one or more lightweight analyses;
if the first set of features matches none of the sets of rules of the one or more lightweight analyses, then a negative classification label is outputted;
if the first set of features matches at least one of the set of rules of the one or more lightweight analyses, performing a deep analysis for the type of malware of each of the at least one matched set of rules;
wherein the deep analysis comprises:
obtaining, by means of a deep analysis submodule, a second set of features of the application by employing system native functions of the device;
running a first machine learning, ML, model, wherein the first ML model outputs a classification label for the analyzed application.

It is important to stress that the following descriptions are directed to embodiments in which the operating system is the Android system. Nevertheless, the skilled person will be able to appreciate that the present invention may be used along with any system which presents functions and characteristics similar to Android, that is, a system which employs, inter alia, system permissions, function calls, intents or equivalent components.

1st Embodiment

Figure 1:
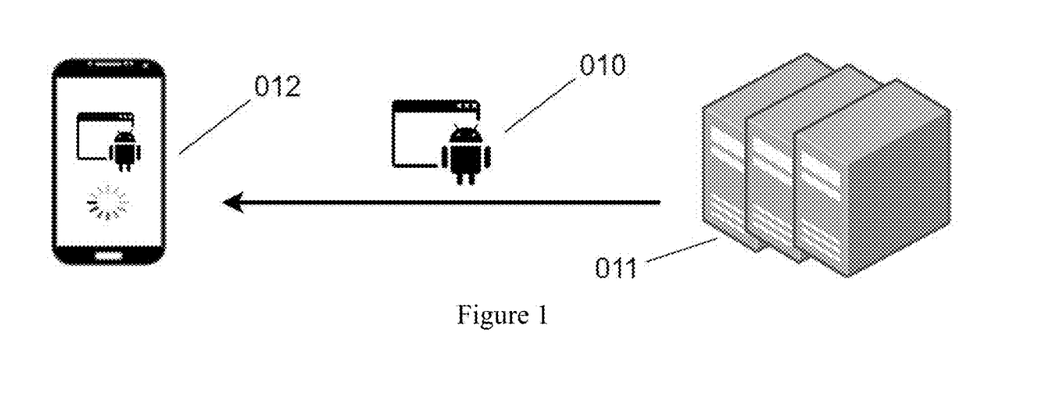
FIG. 1 shows an example of a scenario to which the present invention can be applied, according to an embodiment of the present invention.

The present invention may be applied to any device capable of running the Android operating system, as shown in the overview of FIG. 1. Using an Android device, the user obtains an APK file 010 of an application of interest from a remote server 011 (e.g., through an application market store or downloaded from web repositories) and performs the APK's installation on their device 012. The proposed solution identifies an application installation event and starts analyzing the application before it is in fact installed. The analysis may also be performed after the application is installed on the device, as will be further detailed later. If the analysis labels the application as "malware" (i.e., a positive detection result), then an alert message is shown to the user, who may take actions, such as choosing whether to keep the application installed on the device. In contrast, if the application is labeled as "undetected" (i.e., a negative detection result) then the installation process continues, if the analysis was performed before/during installation, or the application is maintained and nothing is shown to the user, if the analysis was performed after installation.

Figure 2:
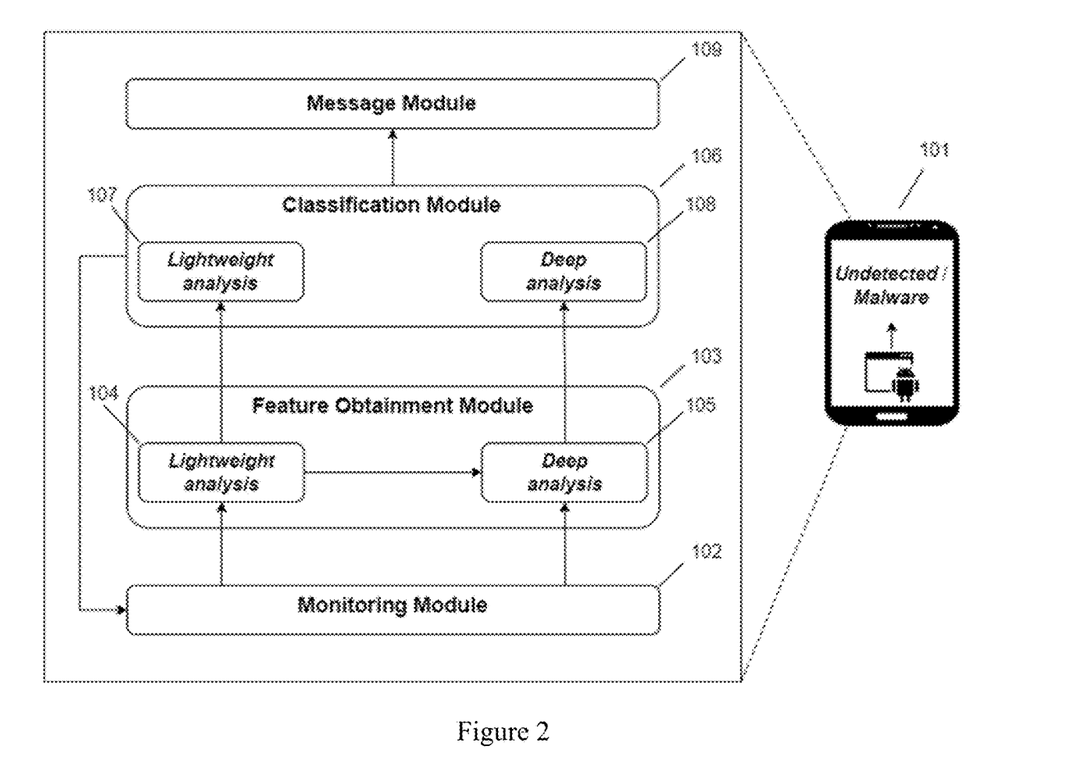
FIG. 2 illustrates a macro view of the architecture of the present invention and its main components, according to an embodiment of the present invention.

FIG. 2 illustrates the general architecture of the present invention and its main components. As mentioned before, the present invention aims at classifying applications as benign or malicious using, for example, the "undetected" and "malware" labels, respectively, and is designed to run on Android devices 101. The present invention's monitoring module 102 runs on the device's background routine to identify "application installation events". The monitoring module 102 communicates with the feature obtainment module 103 when the user requests the installation of an application on their device. The feature obtainment module 103 is composed of two elements: lightweight analysis 104 and deep analysis 105 submodules. The former is responsible for obtaining lightweight features used in rules of the lightweight analysis component 107 of the classification module 106, while the latter obtains a larger set of features used by the ML models comprised in the deep analysis component 108 of the classification module 106. The classification module 106 outputs a result of the application's analysis. If the classification module 106 indicates a high confidence level (CL) on the outputted result, it sends a request to the message module 109 to inform the user of the analysis result. Otherwise, the classification module 106 requests the monitoring module 102 to keep monitoring the application while there are still other steps of the analysis to be executed.

Figure 3:
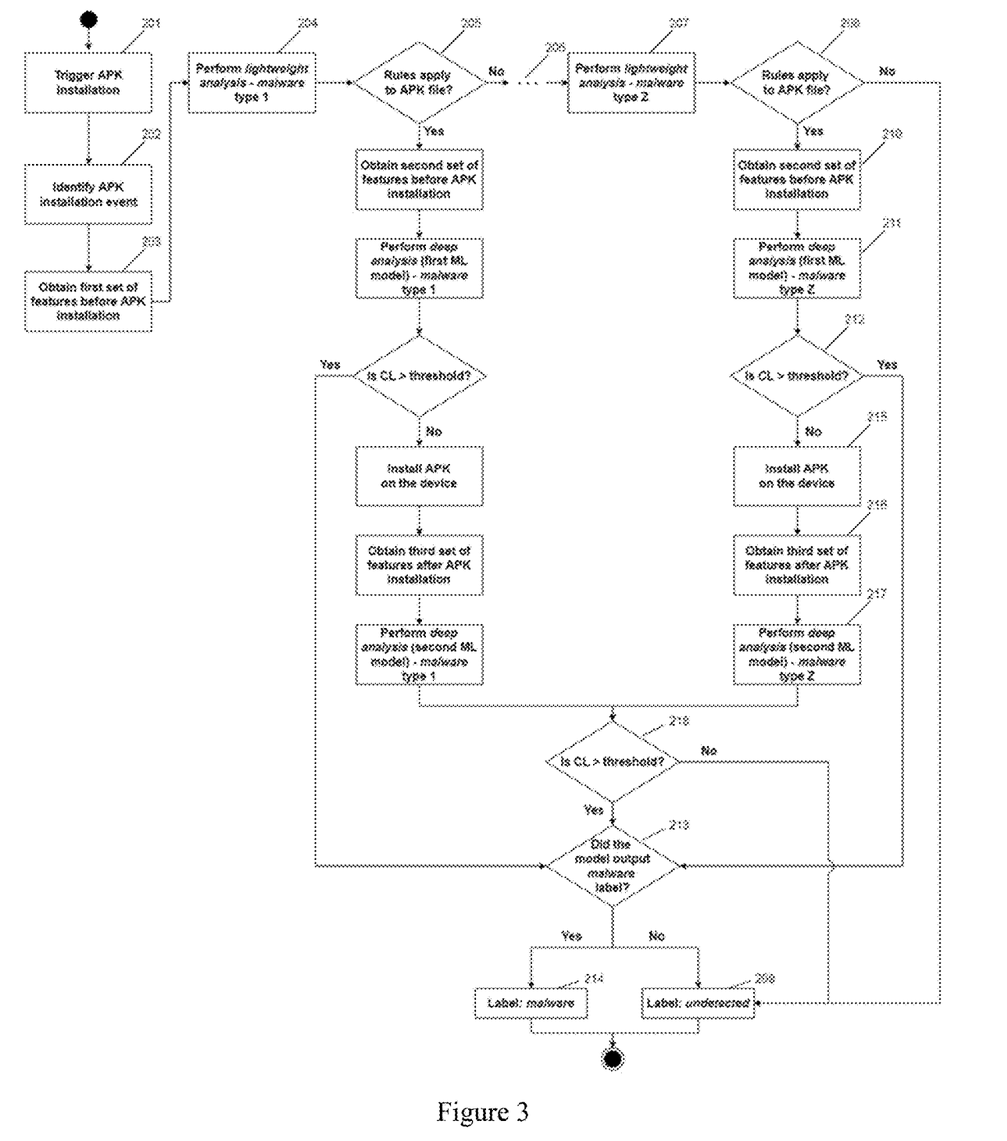
FIG. 3 illustrates the detailed workflow of the present invention during analysis of an APK file, according to an embodiment of the present invention.

A complete workflow of a preferred embodiment of the present invention is shown in FIG. 3. When the user triggers the installation of an application on their device 201, the method of the present invention identifies an application installation event 202 and starts the analysis of the application before it is installed. By employing Android native API functions, the method obtains a first set of features 203 which are related to a set of rules especially adapted to each type of malware of interest (e.g., ransomware, spyware, phone scam, banking, etc.).

For instance, this first set of features may list the "Android permissions" used by the application being analyzed so as to compare them with one or more rules comprising a list of "Android permissions" that are indispensable for a certain type of malware to be able to perform its malicious actions. Thus, to conceive the permission-based rules of a lightweight analysis 104, the type of malware of interest must be studied to understand which permissions (and their combinations) are required to perform a certain malicious action.

This first set of features may be analyzed by one or more malware-specific detectors, each comprising a lightweight analysis submodule 104. Each lightweight analysis submodule applying a malware-specific lightweight analysis 204, 207, each especially adapted to a different type of malware of interest. All these lightweight analysis submodules 104 may preferably be executed in parallel to evaluate the application by means of their specific rule set or, alternatively, there can be defined a specific (and excluding) order of priority regarding the execution of the detectors. In the latter case, the lightweight analysis submodule 104 of malware types that present more specific behaviors should come first. For example, if a malware "type A" manipulates phone calls and a malware "type B" manipulates phone calls and locks the device, then "type B" is more specific than "type A", because the former encompasses the latter's characteristic along with a distinct behavior. Therefore, applications should be first analyzed with the lightweight analysis 104 of malware "type B".

Referring to the preferred embodiment shown in FIG. 3, with the first set of features extracted, the method of the present invention performs the lightweight analysis of malware "type 1" 204. The method then tests whether the rules of this malware type apply to the APK file 205. If the rules do not apply, then a lightweight analysis for a malware of "type 2" is performed in steps similar to the ones performed for malware "type 1" and so on 206 until finally an analysis of malware "type Z" 207 is executed. If the APK's first set of features reaches the lightweight analysis of malware "type Z", the method will test 208 whether the rules for malware "type Z" apply to the APK file. In case no rules apply to the APK file to this point, then this file is labeled as "undetected" 209 and the analysis ends, since no indication of malicious malwares of interest was found. However, if the lightweight rules of a malware type apply to the APK file, the method will execute the steps of deep analysis before installation, as will be discussed in detail later.

Notice that the lightweight analyses submodules 104 do not provide a final classification for the analyzed application. Instead, they indicate whether the application has characteristics of a known type of malware of interest. In case these analyses steps 204, 207 point out that the application does not contain such characteristics, the application is labeled as "undetected", and it is immediately installed on the device. Otherwise, the application, before being installed, is given as input to the deep analysis submodule 105 of the present invention for further analyses.

Suppose that in the step of checking whether the rules of the lightweight analysis of malware "type Z" apply to the APK file 208, the result is positive. In this case, using the Android native API functions, a second set of features is extracted before the APK installation 210. There can be employed several different categories of features in this second set, such as those related to permissions, hardware components and application components. Common types of Android application components are activities, services, receivers, and providers. A feature selection technique may also be adopted over all obtained features to filter out those that are not important to the classification step as a form to decrease the complexity of the ML model by using a smaller number of features. There are many techniques to this end and a combination of them is also a suitable alternative.

With the second set of features, the invention executes a first ML model from the deep analysis before installation 211. The model outputs a classification label for the analyzed APK file, which may be "malware" 214 or "undetected" 209, according to the label given on step 213.

Further Embodiments

On a second embodiment, in addition to the classification label, the first ML model may also output a confidence level (CL) indicating how confident the model is about the outputted label. For instance, in an ML approach that employs an ensemble of classifiers of the same type (e.g., Random Forest), CL can consist of the proportion of classifiers that labeled the analyzed APK file with the outputted label.

It is then compared whether the first CL is equal to or above a predefined threshold 212. If so, the outputted label is accepted and the analysis provides the result to the user. If the first CL is below the predefined threshold in step 212, the classifier is not confident about the classification for the APK file, thus it is installed on the device 215 for another analysis, in a different moment and using a different set of features obtained from the application, as explained next.

In this scenario in which the first CL is below the threshold in step 212 and the application was installed, further embodiments of the invention may collect, using the Android native API functions, a third set of features 216 that can only be obtained after the APK is installed. The third set of features can be obtained from either static (e.g., features related to intents, assets, etc.) or dynamic analysis (e.g., features related to behaviors monitored during the application execution, such as system calls performed). If new static features are obtained, this third set can be combined with the second set of features to have a second ML model (from the deep analysis after installation 211) based on static analysis. If dynamic features are obtained, a second ML model based on dynamic analysis can be adopted instead of, or in complement to, the second static analysis model.

The goal is to have a second model that differs from the first model to increase the chances of correctly classifying the applications. The same or a different approach of feature selection used to build the first ML model can be applied to construct the second model. The third set of features 216 is given as input to the second ML model, from the deep analysis after installation step 211, which performs the last application analysis step 217. Similar to the first model, the second one outputs a classification label and a second confidence level (CL). Preferably, the second CL is compared to a second threshold 218 (defined using the classification results from current model, having the same or a different value from the first threshold 212) and if the second CL is equal to or above the predefined threshold, then the outputted label is accepted and the analysis may provide the respective result to the user ("malware 214 or "undetected" 209) according to the label given on step 213. Otherwise, the analysis has been completed with no concrete level of confidence about the application's label, thus the APK file is finally classified as "undetected" 209. Alternatively, one can ignore the CL returned for the second ML model 218 and accept the result ("malware" 214 or "undetected" 209) from this classifier as final.

Benchmark Results of the Present Invention

To measure the effects of the present invention, it is presented below an example case of Android malware detection. It is important to highlight that the present example is in no way limitative of the present invention and should not restrict the scope of protection, merely serving to illustrate one of the many possible embodiments of the invention.

Consider that one is interested in detecting Android malware related to the type of phone scam. This is a specific and recent threat where malicious applications installed on the device intercept phone calls performed by users to bank institutions or other financial services. The intercepted call is forwarded to attackers to perform social engineering tactics to steal sensitive data. This threat has been causing significant financial loss worldwide. The proposed invention considers the use of one or more malware detectors, each one being specific for a threat of interest. In the use case presented here, we limited the scope to only the detector related to phone scam malware, but other detectors can be created and incorporated to the solution on demand.

Modeling the Invention's Lightweight and Deep Analyses

The present invention requires prior knowledge about some of the main behaviors of a type of malicious application in order to create a set of rules used by the lightweight analysis 204, 207 of a lightweight analysis submodule 104. Since the malware of interest in the use case presented here is phone scam, whose main activity is to intercept phone calls, one can create rules that include this type of activity, which will be applied during an APK file analysis. For instance, the detector can make use of Android permissions in the rules, since this type of element allows applications to perform actions on the device, and without the proper permissions, an application cannot perform specific activities. One example of permission that can be used is PROCESS_OUTGOING_CALLS that allows applications to block and redirect phone calls. This way, an application having this permission is a possible candidate to be a phone scam. Other types of permissions (and their combinations), or even other elements that can be obtained of the APK files in a lightweight fashion, can compose the rule set of the lightweight step of the phone scam detector. A set of rules specific for detecting phone scam applications was created for the tests performed here. For the sake of secrecy, the rules and other specific details about this use case detector will not be revealed.

In the deep analysis of the present invention, ML models (employing algorithms such as support vector machine, neural networks, logistic regression, random forest, decision trees, boosted trees, etc.) are employed to analyze applications, each model being responsible for detecting a specific type of malware of interest. To create a model for each type of malware, the invention requires a specific dataset having "malware applications" of the type of interest and "benign applications" with similar characteristics to the malicious ones (e.g., given the phone scam threat, "benign applications" must also encompass phone call activities). In contrast, most prior-art solutions try to detect all types of threats with a single detector and, therefore, require datasets having benign and malware applications of any type.

Dataset Created to Compare Detection Performance Between the Invention and the Prior-Art To highlight some of the benefits of the present invention, two proof-of-concept detectors were created and compared, in which one ("phone scam detector") uses the process detailed in this invention to detect phone scam and the other ("general detector") employs a conventional ML-based approach used by most solutions in the prior-art to detect several malware types. To this end, we created two datasets composed of benign and malware Android applications. The first dataset, named "Benign—Phone Scam" (B-PS) dataset, is used to train and test the detector that embodies an example of the process of the present invention. The second dataset, named "Benign—General Malware" (B-GM) dataset, is used to train and test the detector based on prior-art solutions.

The B-PS and B-GM datasets were split into training and testing sets. For the "training set", the B-PS was composed of 400 benign and 400 phone scam samples. In turn, the B-GM training set had the same phone scam samples but included additional samples related to other threats, i.e., 400 samples of banking malware and 400 samples of ransomware. The banking and ransomware threats were added to the dataset since they correspond to very common threats and their inclusion aids in creating a more general detector (discussed later) to identify threats other than phone scam, as usually done by most prior-art solutions. The B-PS training set was composed of benign samples presenting phone call activities. In contrast, the B-GM training set encompassed several types of applications. Most solutions on prior-art use datasets having the most downloaded applications from the official Android App Store ("Play Store") belonging to different categories. This design choice of creating this dataset was used in the experiments to ensure the variability required by a general model to perform classification of different threats having a diverse range of behaviors.

A single testing set was elaborated to perform a fair comparison between the detectors. Thus, the B-PS and B-GM testing sets had the same samples, composed of only benign and phone scam samples. This choice of creating this dataset was adopted in order to evaluate how the inclusion of samples with different behaviors (i.e., banking and ransomware) in the training task can impact the general ML model classification results (prior art) compared to the malware-specific model (of the present invention). Table 1 contains the summary of the datasets used in the experiments described next.

TABLE 1

Datasets used for the experiments.

| Dataset | Number of training samples | | | | Number of testing samples | |
| --- | --- | --- | --- | --- | --- | --- |
| | Benign | Phone scam | Banking | Ransomware | Benign | Phone Scam |
| B-PS | 400 | 400 | — | — | 385 | 1,738 |
| B-GM | 400 | 400 | 400 | 400 | | |

Generating the Machine Learning Models

The creation of the ML models used in the experiments are described next. Since the goal of the experiments is to compare the detection results between the invention and the prior-art, only the machine learning model related to the invention's first deep analysis (before installation) was considered. The use of the CL threshold may vary according to preference of the creator of the detection system and the first model results. Besides, its use with the second deep analysis step (after installation) will only improve the results obtained with the first deep analysis.

For the creation of ML models for the method of the present invention and the method of the prior-art, the process was similar and the same features, available before installation of the APK file, were used. Besides, since the deep analysis step before installation is considered, the example case presented includes only static features; however, the use of dynamic features (in the deep analysis step after the APK file installation) is also recommended and can be used to complement the static ones. Some of the static features that can be obtained via Android API functions (without infringing licenses and terms of use from applications) before installation are related to permissions, hardware components, and some software components (such as activities, services, providers, and receivers). Other features related to the APK file attributes can also be used without the need for decompilation, such as size, hash, certificate, among others. Since solutions on the prior-art obtain their features directly from APK files, we also adopted this approach for the general detector of the present example case. For accomplishing this, the tool APKParser was used. APKParser is a popular tool adopted by many works on the literature.

After obtaining the features, it is recommended the use of feature selection algorithms to filter out those features that do not contribute to the classification process. Here, we used the SelectFromModel technique. In addition, as ML algorithm, we selected Random Forest (with 50 estimators) since it is generally the one with the best results in the prior-art. By employing SelectFromModel and Random Forest on the B-PS training set, the phone scam model, in accordance with the present invention, was generated with 23 features. In turn, after applying the ML techniques on the B-GM training set, the general model, in accordance with the prior-art, was created with 47 features. We can observe that the approach of the present invention results in simpler models compared to the prior-art. As advantages of simpler models, the classification task can be performed more efficiently, and the models can be easily interpreted in order to understand which features are more important while classifying applications.

Evaluating the Machine Learning Models

The created models were tested on their corresponding training sets as well as on the testing set to collect results regarding detection performance. Table 2 shows the confusion matrix obtained after testing the phone scam model on the B-PS training set, while Table 3 presents the confusion matrix collected upon testing the general model on the B-GM training set. We can observe that the phone scam model was able to classify all its training samples correctly. In contrast, even by learning with the training samples, the general model could not classify all the samples correctly. In particular, 2 benign, 2 phone scam, 25 banking, and 5 ransomware samples were misclassified. This is a considerable indication that more specific models (those created with the present invention) can have better detection performance of training samples than more general models.

TABLE 2

Results of testing the phone scam model on the B-PS training set.

| True values | Classification values | |
| --- | --- | --- |
| | Benign | Phone scam |
| Benign | 400 | 0 |
| Phone scam | 0 | 400 |

TABLE 3

Results of testing the general model on the B-GM training set.

| True values | Classification values | | | |
| --- | --- | --- | --- | --- |
| | Benign | Phone scam | Banking | Ransomware |
| Benign | 398 | 0 | 1 | 1 |
| Phone scam | 0 | 398 | 2 | 0 |
| Banking | 0 | 0 | 375 | 25 |
| Ransomware | 0 | 0 | 5 | 395 |

The created models were also tested on the testing set. Table 4 shows the confusion matrix with results obtained for the phone scam model. In turn, Table 5 presents the confusion matrix obtained for the general model. The results show that no benign samples were misclassified by the phone scam model, while 32 benign samples were misclassified by the general model. This indicates a strong advantage of the present invention, i.e., a decrease on the number of false positives. By decreasing the amount of false positives, the proposed solution would not emit false alarms that could induce users to think that benign applications they want to use may be malicious. Reducing the number of false alarms is a strongly desirable feature for malware detection since it improves the credibility of the detection solution and causes a positive impact on the users' experiences.

TABLE 4

Results of testing the phone scam model on the B-PS testing set.

| True values | Classification values | |
| --- | --- | --- |
| | Benign | Phone scam |
| Benign | 385 | 0 |
| Phone scam | 4 | 1,734 |

TABLE 5

Results of testing the general model on the B-GM testing set.

| True values | Classification values | | | |
| --- | --- | --- | --- | --- |
| | Benign | Phone scam | Banking | Ransomware |
| Benign | 353 | 8 | 23 | 1 |
| Phone scam | 1 | 1,602 | 134 | 1 |
| Banking | — | — | — | — |
| Ransomware | — | — | — | — |

The results from Tables 4 and 5 also show that the general model was not able to properly learn several characteristics of phone scam samples. For example, 134 phone scam samples were wrongly classified by the general model as banking. Furthermore, 2 other phone scam samples were misclassified, one as benign and another as ransomware. In contrast, the phone scam model, created with the approach of the present invention, presented only four 4 misclassified samples. This demonstrates that more specific models can clearly learn the particularities of a certain type of malware, improving their capacity to correctly indicate the right label for a given sample.

Dataset Created to Compare Execution Time Between the Invention and the Prior-Art The experiments discussed next aim to show how the present invention outmatches most prior-art solutions regarding the time to perform the classification and computer resources' consumption.

For the experiments related to time performance, two new sets of APK files were used. The first one contains 50 benign applications, extracted from the B-GM dataset, with no traces of phone call activities to be evaluated only by the lightweight analysis of the present invention, since they will not be forwarded to the deep analysis. The second set contains other 50 distinct applications from the B-PS dataset, half benign and half phone scam, to be evaluated by both the lightweight and deep analyses. The two sets were also evaluated by the prior-art solution to compare its results with those of the present invention. Table 6 summarizes the information on the tested APK files.

TABLE 6

Information on the sets of tested APK files: Time evaluation.

| APK file set | APK files (#) | Average size (MB) |
|---|---|---|
| Set 1 (benign - no phone call permission) | 50 | 78.34 ± 40.39 |
| Set 2 (benign - with phone call permissions/ phone scam) | 50 (25/25) | 5.68 ± 2.14 |

Execution Time Results

Table 7 shows the results for the time evaluation. The data shown in the table correspond to the two analyses (lightweight and deep) of the present invention, including a separate time related to only the feature obtainment procedure required by both analyses. Notice that, for the APK set 1, which has benign applications with no permissions of interest for the phone scam detector, there is no time necessary to perform the deep analysis since the lightweight step already filtered out those applications with no characteristics of interest. For the prior-art solution, there is a single analysis step related to the general model, thus only one execution time for analysis is presented along with the execution time of the feature obtainment procedure.

TABLE 7

Average time to obtain features and perform each analysis step from invention and prior-art solution.

| | Average time (ms) | | | | |
|---|---|---|---|---|---|
| | Invention | | | Prior-art | |
| Set | Obtainment | Lightweight | Deep | Obtainment | Analysis |
| Set 1 (benign) | 47.22 ± 13.88 | 6.58 ± 2.30 | — | 211.02 ± 103.19 | 16.08 ± 5.59 |
| Set 2 (benign/ phone scam) | 61.12 ± 18.48 | 8.34 ± 2.52 | 23.06 ± 3.47 | 221.94 ± 84.28 | 22.08 ± 12.32 |

The results show that, for both sets, the feature obtainment procedure of the phone scam detector in accordance with the present invention is at least three times faster than the general detector in accordance with the prior-art techniques. The approach used by the present invention, which does not infringe any licenses or terms of use of the application(s) being analyzed, proves to be a better choice regarding performance. The results of the analyses indicate that the lightweight analysis of the present invention is almost three times faster than the ML-based ones from the prior-art. When the total time for analyzing an application is considered (lightweight and deep analyses), the phone scam detector according to the present invention performs worse than the general detector, which needs to only perform a single analysis to return a classification label. However, Table 8 shows that this disadvantage is mitigated when it is considered that the phone scam detector would stop the analysis of many applications on the lightweight step. Besides, the whole process of the invention (considering feature obtainment and analyses processes) is still three times faster than the prior-art solution, indicating the overall lightweight behavior of the invention with respect to execution time.

TABLE 8

Total execution time of the solutions to analyze all samples from the sets of tested APK files.

| | Time to obtain features and analyze the entire set (ms) | |
|---|---|---|
| Set | Invention | Prior-art |
| Set 1 (benign) | 2,690.00 | 11,355.00 |
| Set 2 (benign/phone scam) | 4,626.00 | 12,201.00 |
| | 7,316.00 | 23,556.00 |

The results also show that, generally, the size of an APK file has a small impact on the analysis time (including the feature obtainment procedure), since most features used in the experiments are easy to obtain and do not require processing every element of the APK file (e.g., most features used here are available in the manifest file).

Dataset Created to Compare Resources Consumption Between the Invention and the Prior-Art Another aspect that can be analyzed from the example case presented here is "resource consumption". To this end, two other sets of APK files obtained from sets 1 and 2 of Table 6 were used. Due to the complexity of this test, which required to be manually performed to not invalidate the results, a smaller number of files was used to analyze the resource consumption of the present invention and the prior-art solution. Table 9 shows general information about the two new sets.

TABLE 9

Information on the sets of tested APK files: Resource consumption.

| APK file set | APK files (#) | Average size (MB) | Label |
|---|---|---|---|
| Set 3 (benign) | 4 | 43.65 ± 6.06 | benign (no phone call related permissions) |
| Set 4 (benign/ phone scam) | 4 (2/2) | 6.81 ± 3.41 | benign (with phone call related permissions)/phone scam |

Resource Consumption Results

Table 10 presents the results of resource consumption of the phone scam detector of the present invention in comparison to the prior-art solution regarding the main components of electronic devices: CPU and memory. It is important to highlight that the CPU usage is proportional to the energy consumption, thus the lower, the better. The results, shown as an average of the peak values obtained during each test, indicate that the CPU consumption of the phone scam detector according to the present invention is more than two times lower compared to the values of the general detector, with the exception to the initialization phase, when the solutions consume very similar amounts of CPU. During the feature obtainment procedures, the use of Android API functions (with the present invention's approach) did show a better option than APKParser (in accordance with the prior-art solution). Furthermore, the model complexity (based on the number of features used) has also proven to be a good approach for decreasing the use of CPU, and hence, the consumption of energy of the device.

Regarding the memory consumption, the results indicate that, in general, the detectors required similar amounts of memory to execute. The two main aspects that differentiate the compared solutions, i.e., the feature obtainment procedure and the ML models, did not contribute to a significant increase or decrease in memory consumption values.

TABLE 10

Resources consumption of the invention and prior-art solution during each main step of a classification task.

| | | Resources consumption (average peak values) Invention/Prior-art | | | | |
|---|---|---|---|---|---|---|
| Set | Metric | Initialization | Obtainment | Lightweight | Deep/Analysis | Idle state |
| #3 | CPU (%) | 17.75/19.50 | 10.75/19.00 | 5.25/— | —/7.25 | 0.00/0.00 |
| | Memory (MB) | 183.12/182.20 | 109.47/109.47 | 98.50/— | —/104.87 | 110.25/104.45 |
| #4 | CPU (%) | 19.00/18.50 | 8.00/19.75 | 4.25/— | 2.50/6.50 | 0.00/0.00 |
| | Memory (MB) | 176.75/181.07 | 104.07/108.07 | 98.07/— | 98.17/102.85 | 106.40/104.00 |

Hardware Implementations

It is worth mentioning that the example embodiments described herein may be implemented using hardware, software or any combination thereof and may be implemented in one or more computer systems or other processing systems. Additionally, one or more of the steps described in the example embodiments herein may be implemented, at least in part, by machines. Examples of machines that may be useful for performing the operations of the example embodiments herein include general purpose digital computers, specially-programmed computers, desktop computers, server computers, client computers, portable computers, mobile communication devices, tablets, and/or similar devices.

For instance, one illustrative example system for performing the operations of the embodiment herein may include one or more components, such as one or more microprocessors, for performing the arithmetic and/or logical operations required for program execution, and storage media, such as one or more disk drives or memory cards (e.g., flash memory) for program and data storage, and a random access memory, for temporary data and program instruction storage.

Moreover, the aforementioned system of the present invention may also include software resident on a storage media (e.g., a disk drive or memory card), which, when executed, directs the microprocessor(s) in performing transmission and reception functions. The software may run on an operating system stored on the storage media, such as, for example, the Android operating system, and the like, and can adhere to various protocols such as the Ethernet, ATM, TCP/IP protocols and/or other connection or connectionless protocols.

As is well known in the art, microprocessors can run different operating systems, and can contain different types of software, each type being devoted to a different function, such as handling and managing data/information from a particular source, or transforming data/information from one format into another format. The embodiments described herein are not to be construed as being limited for use with any particular type of server computer, and that any other suitable type of device for facilitating the exchange and storage of information may be employed instead.

In this regard, the present invention relates to a system for detecting malware in an application to be installed on a device using the method in accordance with the present invention, wherein the system comprises:

a feature obtainment module comprising a first lightweight analysis submodule configured to obtain, before the application is installed, a first set of features of the application by employing system native functions of the device;

a classification module comprising a second lightweight analysis submodule configured to:
  perform one or more lightweight analysis on the first set of features, wherein each lightweight analysis comprises a set of rules configured to identify a single type of malware;
  check whether the first set of features matches the set of rules of at least one of the one or more lightweight analysis;
  if the first set of features matches none of the sets of rules of the one or more lightweight analysis, then a negative classification label is outputted;
  if the first set of features matches at least one of the set of rules of the one or more lightweight analysis, the system performs a deep analysis for the type of malware of each of the at least one matched set of rules;
wherein the deep analysis is performed by means of:
a first deep analysis submodule configured to obtain a second set of features of the application by employing system native functions of the device;
a second deep analysis submodule configured to run a first machine learning, ML, model, wherein the first ML model outputs a classification label for the analyzed application.

Software embodiments of the illustrative example embodiments presented herein may be provided as a computer program product, or software, that may include an article of manufacture on a machine-accessible or non-transitory computer-readable medium (also referred to as "machine-readable medium") having instructions. The instructions on the machine accessible or machine-readable medium may be used to program a computer system or other electronic device. The machine-readable medium may include, but is not limited to, floppy diskettes, optical disks, CD-ROMs, and magneto-optical disks or other type of media/machine-readable medium suitable for storing or transmitting electronic instructions.

The present invention also relates to a non-transitory computer-readable medium which comprises computer-readable instructions that, when executed by one or more processors, cause the one or more processors to perform the method as defined in the present invention.

Advantages of the Present Invention

In view of the discussions and descriptions above, along with the results shown, it is evident that the present invention has considerable advantages over the solutions disclosed in the prior-art.

For instance, the present invention differs from that of patents U.S. Ser. No. 10/929,532B1 and U.S. Pat. No. 9,064,115B2 mainly on the types of features adopted and by including a multi-stage and specific-type detection approach, aiming to reduce the number of misclassified samples, common in ML-based techniques. Besides, the procedure to obtain the features for the classification task described in U.S. Ser. No. 10/929,532B1 and U.S. Pat. No. 9,064,115B2 is less efficient and infringes licenses and terms of use of applications that restrict reverse-engineering, decompilation, or disassembly of applications, which the present invention respects by obtaining all necessary analysis data from the Android operating system.

Additionally, in the present invention, instead of separating the analysis by the type of application, like e.g. documents U.S. Ser. No. 10/320,835B1 and U.S. Pat. No. 9,721,212B2, the analysis is separated by the type of malware threat of interest. Although the approach used in the present invention also applies a rule-based approach for the analysis, it has a complementary step that applies ML models (specific for each type of threat) using more than just permission features. The present invention can also use hardware and some application components, intent filters, assets information, and even dynamic features obtained during execution of the application. In addition, by using a multi-stage approach for detection and malware-specific detectors, the present invention can reduce the number of misclassified samples.

Moreover, the static features obtainment process described in U.S. Pat. No. 9,721,212B2 is invasive and infringes licenses and terms of use adopted by applications, since it obtains features related to APIs, methods, and function calls that are all obtained after decompiling or disassembling the application. The present invention respects such licenses by employing an appropriate feature obtainment process using information only provided by the Android operating system.

Also, in contrast with document "*A Data-driven Characterization of Modern Android Spyware*", the present invention is based on a multi-stage detection approach, which is able to analyze applications before their installation, and does not require (although the last analysis step can be done right after the installation or may involve) the execution of the application. This prevents some applications (e.g., ransomware) to perform their activity, which can be dangerous and too late if an analysis is performed during or after their execution. The present invention can analyze (at most) three times an application, in different moments, and in case a malicious behavior is identified, an action can be taken, even before the installation of the application. Besides, monitoring all (or a large portion of) activities performed by an application to obtain the dynamic features, as proposed in the paper, can be inefficient regarding energy consumption. In the present invention, the dynamic features (if chosen to be used) can be obtained via hooks on a few specific behaviors of interest from applications.

In a further instance, compared with the proposed solution of document "*DNA-Droid: A Real-Time Android Ransomware Detection Framework*", although the present invention also uses a multi-stage detection approach, it adopts as first analysis a lightweight rule-based method to efficiently discard from analysis those applications with no traces of malicious behavior according to the malware types of interest for detection, which can be ransomware and additional ones. By using a second ML model, with a different set of features, to make the final decision for a sample that was classified with low confidence level by a first ML model, the invention also reduces the chances of presenting misclassified samples. Furthermore, the present invention differs from the "DNA-Droid" approach, described in the paper, by employing a different feature set for classification. Although in the dynamic analysis a similar approach can be adopted in the invention, in the static analysis the present invention uses a set of features whose extraction is efficient and does not infringe any licenses or terms of use. Differently, "DNA-Droid" uses features whose extraction requires disassembling the APK file.

While various example embodiments have been described above, it should be understood that they have been presented by way of example, and not limitation. It will be apparent to persons skilled in the relevant art(s) that various changes in form and detail can be made therein.

What is claimed is:

1. A non-invasive computer implemented method for malware detection in an application to be installed on a device, comprising:
   obtaining, by a first lightweight analysis submodule and before the application is installed, a first set of features of the application by employing system native functions of the device;
   performing one or more lightweight analyses on the first set of features, wherein each lightweight analysis comprises a set of rules configured to identify a single type of malware;
   checking whether the first set of features matches the set of rules of at least one of the one or more lightweight analyses;
   outputting a negative classification label, provided the first set of features matches none of the set of rules of the at least one of the one or more lightweight analyses;
   performing a deep analysis for a type of malware of each of at least one matched set of rules, provided the first set of features matches at least one of the set of rules of the one or more lightweight analyses;
   wherein the deep analysis comprises:
      obtaining, by a deep analysis submodule, a second set of features of the application by employing the system native functions of the device, running a machine learning (ML) model, wherein the ML model outputs a classification label for the analyzed application, wherein the system native functions are native Android Application Programming Interface (API) functions, wherein when there are two or more lightweight analysis:
the two or more lightweight analysis are executed in parallel, or
the two or more lightweight analysis are executed in sequence and a specific and excluding order of priority of execution of each of the two or more lightweight analysis is employed, wherein an order of lightweight analysis is from malware types with a more specific behavior to ones with less specific behavior.

2. The non-invasive computer implemented method of claim 1, further comprising providing the outputted classification label to a user.

3. The non-invasive computer implemented method of claim 1, wherein the method is carried out upon identifying an application installation event of the application on the device when a user triggers an installation event.

4. The non-invasive computer implemented method of claim 1, wherein:
the ML model further outputs a confidence level (CL) indicative of the confidence of the ML model in the outputted label,
the method further comprising:
checking whether the CL is equal to or above a predefined threshold, and
provided the CL is equal to or above the predefined threshold, the outputted label is accepted.

5. The non-invasive computer implemented method of claim 4, wherein the ML model is a first ML model and the CL is a first CL, and:
provided the first CL is below the predefined threshold, the application is installed on the device for further analysis,
wherein analyzing the application after installation comprises:
obtaining, by the deep analysis submodule, a third set of features of the application by employing the system native functions of the device, and
running a second ML model, different from the first ML model, wherein the second ML model outputs a classification label for the analyzed application.

6. The non-invasive computer implemented method of claim 5, wherein the second ML model also outputs a second CL and before providing results to a user, the method further comprises:
checking whether the second CL is equal to or above a predefined threshold,
provided the second CL is equal to or above the predefined threshold, the outputted label is accepted, and
provided the second CL is below the predefined threshold, a negative label is outputted.

7. The non-invasive computer implemented method of claim 1, wherein:
the first set of features comprises a list of system permissions used by the application being analyzed, and
each set of rules of each lightweight analysis comprises a list of system permissions that are indispensable for a specific type of malware.

8. The non-invasive computer implemented method of claim 1, wherein each set of rules is configured to identify one type of malware of a group comprising: ransomware, banking, spyware, adware, scareware, and phone scam malwares.

9. The non-invasive computer implemented method of claim 5, wherein the second set of features comprises features related to one or more of permissions, hardware components and application components, wherein the application components comprise one or more of system activities, services, receivers, and providers.

10. The non-invasive computer implemented method of claim 9, wherein, to decrease complexity of the second ML model, the second set of features undergo through a feature selection process to filter out features that do not contribute for the detection of the one or more types of malware.

11. The non-invasive computer implemented method of claim 5, wherein:
the first ML model and the second ML model employ an ensemble of classifiers of the same type, with a Random Forest classifier as an option.

12. The non-invasive computer implemented method of claim 11, wherein the CL comprises of a proportion of classifiers that labeled the analyzed application with the outputted label.

13. The non-invasive computer implemented method of claim 1, wherein the outputted labels are malware or undetected.

14. The non-invasive computer implemented method of claim 5, wherein the third set of features comprises of features obtainable after the application is installed.

15. The non-invasive computer implemented method of claim 5, wherein the third set of features comprise features obtained from either static analysis or dynamic analysis.

16. The non-invasive computer implemented method of claim 15, wherein:
features obtained by the static analysis comprise one or more of features related to intents and assets, and
the features obtained by the dynamic analysis comprise features related to behaviors monitored during execution of the application including system calls.

17. The non-invasive computer implemented method of claim 15, wherein:
provided new static features are obtained, the third set of features is combined with the second set of features to have a second ML model based on static analysis, and
provided dynamic features are obtained, a second ML model based on dynamic analysis is adopted instead of, or in complement to, a static analysis model.

18. A non-transitory computer-readable medium which stores computer-readable instructions that, when executed by one or more processors, cause the one or more processors to perform the non-invasive computer implemented method as defined in claim 1.

19. A system for detecting malware in an application to be installed on a device, the system comprising:
a memory; and
a hardware processor communicatively coupled to the memory to:
obtain, using a feature obtainment module comprising a first lightweight analysis submodule, before the application is installed, a first set of features of the application by employing system native functions of the device;
using, a classification module comprising a second lightweight analysis submodule:

perform one or more lightweight analysis on the first set of features, wherein each lightweight analysis comprises a set of rules configured to identify a single type of malware, check whether the first set of features matches the set of rules of at least one of the one or more lightweight analysis, output a negative classification label, provided the first set of features matches none of the sets of rules of the one or more lightweight analysis, perform a deep analysis for a type of malware of each of at least one matched set of rules, provided the first set of features matches at least one of the set of rules of the one or more lightweight analysis, wherein the deep analysis is performed by:
a first deep analysis submodule configured to obtain a second set of features of the application by employing the system native functions of the device, a second deep analysis submodule configured to run a machine learning (ML) model, wherein the ML model outputs a classification label for the analyzed application, wherein the system native functions are native Android Application Programming Interface (API) functions, wherein when there are two or more lightweight analysis:
the two or more lightweight analysis are executed in parallel, or the two or more lightweight analysis are executed in sequence and a specific and excluding order of priority of execution of each of the two or more lightweight analysis is employed, wherein an order of lightweight analysis is from malware types with a more specific behavior to ones with less specific behavior.

20. The system of claim 19 further comprising a message module for providing the outputted classification label to a user.

21. The system of claim 19, further comprising a monitoring module for identifying an application installation event.

22. The system of claim 19 wherein the second deep analysis submodule is further configured to:
output a confidence level (CL) indicative of the confidence of the ML model in the outputted label,
check whether the CL is equal to or above a predefined threshold,
provided the CL is equal to or above the predefined threshold, the outputted label is accepted.

23. The system of claim 22, wherein the ML model is a first ML model and the second deep analysis submodule is further configured to:
provided the CL is below the predefined threshold, the application is installed on the device for further analysis,
wherein the first deep analysis submodule is further configured to obtain a third set of features of the application by employing the system native functions of the device, and
wherein the second deep analysis submodule is further configured to run a second ML model, different from the first ML model, wherein the second ML model outputs a classification label for the analyzed application.

24. The system of claim 23, wherein the CL is a first CL, and the second deep analysis submodule is further configured to:
output a second CL,
check whether the second CL is equal to or above a predefined threshold,
provided the second CL is equal to or above the predefined threshold, the outputted label is accepted, and
provided the second CL is below the predefined threshold, a negative label is outputted.

* * * * *